United States Patent [19]
Tabata et al.

[11] Patent Number: 4,748,143
[45] Date of Patent: May 31, 1988

[54] PEROVSKITE-TYPE OXIDATION CATALYSTS AND METHOD FOR PREPARING THE CATALYSTS

[75] Inventors: Kenji Tabata; Ikuo Matsumoto, both of Ikoma, Japan

[73] Assignee: Matsushita Electric Industrial Co., Ltd., Japan

[21] Appl. No.: 871,551

[22] Filed: Jun. 6, 1986

[30] Foreign Application Priority Data

Jun. 7, 1985 [JP] Japan ................. 60-124473

[51] Int. Cl.$^4$ .................... B01J 23/02; B01J 23/10
[52] U.S. Cl. ................... 502/304; 502/302; 502/525
[58] Field of Search ........... 502/302, 303, 304, 525; 423/593

[56] References Cited

U.S. PATENT DOCUMENTS 3,901,828 8/1975 Mai et al. ................. 502/525 X
3,922,204 11/1975 Tseung et al. ............. 502/525 X
4,134,852 1/1979 Volin ....................... 502/302

FOREIGN PATENT DOCUMENTS 0089199 9/1983 European Pat. Off. .
2119702 11/1971 Fed. Rep. of Germany .
38825 7/1931 France .

Primary Examiner—W. J. Shine
Attorney, Agent, or Firm—Lowe, Price, LeBlanc, Becker & Shur

[57] ABSTRACT

An oxidation catalyst of the perovskite-type compound oxide which comprises, as A site, a mixture of rare earth elements from ores, part of which is replaced by at least one element selected from alkali metals, alkaline earth metals and rare earth elements other than the ore-originating elements, and a transition metal as B site. The surface atomic ratio of the mixed rare earth elements and the transition metal is in the range of 1.0:1.0 to 1.1.:1.0. A method for preparing the compound oxide is also described.

14 Claims, No Drawings

PEROVSKITE-TYPE OXIDATION CATALYSTS AND METHOD FOR PREPARING THE CATALYSTS

BACKGROUND OF THE INVENTION

1. Field of the Invention

This invention relates to oxidation catalysts which are useful in treating exhaust gases from various combustors by decomposing hydrocarbons and carbon monoxide contained in the exhaust gases for complete oxidation into carbon dioxide and water vapor and are also useful in treating relatively light liquid hydrocarbons, such as kerosene, gas oil and the like, and hydrocarbons, such as methane, propane and the like, by catalytic combustion with air. The invention also relates to a method for preparing the oxidation catalysts.

2. Description of the Prior Art

It is known that the platinum group metals, such as platinum, palladium, rhodium and the like, have the highest activity when used as catalysts for completely oxidizing unburnt hydrocarbons in the presence of air into carbon dioxide and water vapor. In application as an oxidation catalyst, the platinum group metals are used as follows. Various inorganic refractory materials, such as cordierite, mullite and the like, are molded in the form of, for example, a honeycomb and inorganic refractory materials having a high surface area, e.g. gamma-alumina, are undercoated on the molding, after which the platinum group metal is deposited on the molding. However, the platinum group metal catalysts are disadvantageous in that they are expensive and it is difficult to stably supply the metals from the standpoint of resources. In addition, the platinum group metal catalysts are not so resistant to heat and thus, when employed at high temperatures not lower than 600° C. over a long term, the catalysts are apt to thermally deteriorate, known as a sintering phenomenon. Accordingly, there is a high demand of development of catalysts which are more resistant to heat.

Oxides of base metals such as cobalt, nickel, iron and the like serve as oxidation catalysts, but are lower in oxidation activity than the platinum group metal catalysts and have a low heat resistance. Thus, these base metal oxides have not been in use as complete oxidation catalysts. In order to overcome these disadvantages, a variety of compound oxides have been recently studied. Especially, extensive studies have been made on compound oxides having a perovskite structure because of the high activity for oxidation. These perovskite compound oxides are represented by the formula, $ABO_3$, in which A represents a rare earth metal such as lanthanum, neodium or the like, and B represents a transition metal such as cobalt, iron, nickel or the like. In addition, the compound oxides of the formula, $AA'BO_3$, in which part of A is replaced by A' wherein A' represents cesium, strontium or the like, are known as to improve the activity. It has been reported that when cobalt is used as the transition metal represented by B, the highest activity results.

As is known in the art, rare earth elements are collected from ores which usually contain a mixture of various rare earth elements. However, it is very difficult to separate these rare earth elements from one another, thus inviting high production costs. The proportion in cost of the rare earth elements in perovskite-type catalysts is very high.

SUMMARY OF THE INVENTION

It is an object of the invention to provide oxidation catalysts of perovskite-type compound oxides which have high oxidation activity and are highly resistant to heat.

It is another object of the invention to provide oxidation catalysts of perovskite-type compound oxides which can be obtained much less expensively than known perovskite compound oxides.

It is a further object of the invention to provide a method for preparing the oxidation catalysts of perovskite-type compound oxides as mentioned above.

The oxidation catalyst of the present invention comprises a compound oxide having a perovskite structure which is represented by the formula $AA'BO_3$, in which A represents a mixture of rare earth elements originating from an ore containing the rare earth elements, A' represents at least one element which is selected from the group consisting of alkali metals, alkaline earth metals and rare earth elements and which have a tolerance factor, $t=(r_A+r_O)/\sqrt{2}(r_B+r_O)$, in which $r_A>0.90$ angstroms, $r_B>0.51$ angstroms, and $r_O$ is a radius of oxygen ion, in the range of $0.75 \leq t \leq 1.0$, and has a valence and ionic radius different from the rare earth elements from the ore, and B represents a transition metal, the at least one element being added in such an amount that a surface atomic ratio of the transition metal and the rare earth elements of the A site is in the range of from 1.0:1.0 to 1.1:1.0. Preferably, the atomic ratio should be substantially a stoichiometric ratio of 1:1.

A method for preparing an oxidation catalyst of the perovskite type according to the invention comprises providing an ore containing a plurality of rare earth elements in the form of oxides. The oxides are dissolved in mineral acids. At least one element selected from alkali metals, alkaline earth metals and rare earth metals is also dissolved in the mineral acid. Moreover, at least one transition metal oxide is added prior to or simultaneously with the dissolution of the oxides of the rare earth elements. The resulting solution is charged into an alkaline solution, which preferably contains an oxidizing agent capable of generating oxygen, to obtain a precipitate. The precipitate is washed with water and sintered to obtain a perovskite-type oxidation catalyst. This catalytic component may be used as is, or after deposition on any suitable carriers in various forms, such as a honeycomb, of inorganic refractory materials, e.g. cordierite, mullite and the like.

DETAILED DESCRIPTION AND EMBODIMENTS OF THE INVENTION

As is known, the catalytic activity of perovskite compound oxides is chiefly dominated by the transition metal in the B site. The elements in the A and/or A' site are necessary only for maintaining the crystal structure of the compound oxide. We have made studies on the oxidation activity in which a variety of rare earth elements in the A site are used in different combinations to determine the activity. As a result, it has been found that a significant change in the oxidation activity does not take place although slight changes are observed.

The perovskite-type compound oxides prepared above were subjected to electron spectrometry for chemical analysis (ESCA), with the result that the oxidation activity changed with a change in surface atomic ratio of a transition metal and rare earth elements. The term "surface atomic ratio" used herein is intended to mean an atomic ratio of a transition metal and the total rare earth elements to a depth of 10 to 20 angstroms as determined by electron spectroscopy for chemical analysis.

Moreover, it was found that when lanthanum was used as an element in the A site and part of the lanthanum was substituted with an element such as cerium, strontium or the like, which had a valence different from lanthanum, the activity was significantly improved when cerium was used in an amount of 10 atomic percent or strontium was used in an amount of 20 atomic percent. These samples were also subjected ESCA, revealing that the atomic ratio of cobalt and lanthanum on the surfaces was in a maximum and was almost stoichiometric at the highest activity.

Based on the above findings, we could solve the problem of the high cost of perovskite-type oxidation catalysts using a single rare earth element owing to the difficulty in separation of the element.

As described before, the invention provides an oxidation catalyst of the perovskite-type compound oxide of the general formula, $AA'BO_3$, in which A is a mixture of rare earth elements collected from an ore, A' is at least one element selected from alkali metals, alkaline earth metals, rare earth elements other than those contained in the mixture, and B represents a transition metal. The at least one element should have a valence and an atomic ratio which are different from the mixed rare earth elements. In addition, in order to maintain the perovskite structure, the at least one element should have a tolerance factor, $t=(r_A+r_O)/\sqrt{2}(r_B+r_O)$, in which $r_A > 0.90$ angstroms, $r_B > 0.51$ angstroms, and $r_O$ is a radius of oxygen ion, in the range of $0.75 \leq t \leq 1.0$. The at least one element serves to control the surface atomic ratio of the transition metal and the mixed rare earth elements in the resulting compound oxide as will be described hereinafter. The surface atomic ratio is thus controlled to have nearly a stoichiometric ratio of 1:1. The mixed rare earth elements may be La, Pr, Nd and the like, which vary depending on the type of ore. Aside from the above elements, Sm may be contained in ores. However, the mixed rare earth elements are not limited to those indicated above, and substantially all combinations of rare earth elements may be used in the A site if such combinations are obtained from ores. The elements are generally in the form of oxides in ores.

The at least one element, which is replaced by part of the rare earth elements in the A site and whose valence and atomic radius are determined as defined above, may be alkali metals such as Na, K, Li and the like, alkaline earth metals such as Ca, Mg, Sr, and the like, and rare earth elements other than those contained in ores, such as Yb, Eu and the like. The metals or elements indicated above are all useful in the practice of the invention, of which Ce, Sr and Ca are prferred. The atomic ratio in bulk or starting composition of the at least one element is not critical and depends on the composition of the mixed rare earth elements. In other words, the atomic ratio of the bulk or starting composition is determined such that the surface atomic ratio of the transition metal and the mixed rare earth elements is within a range from 1.0:1.0 to 1.1:1.0 and preferably 1:1.

The transition metal used in the B site may be cobalt, nickel, iron or mixtures thereof, of which Co is preferably used.

For the preparation of the oxidation catalyst of the perovskite-type compound oxides, ores containing a mixture of rare earth elements in the form of oxides, e.g. monazite, are provided, from which the mixture is collected by a suitable technique. The mixed oxides are dissolved in mineral acids, such as nitric acid, to which at least one element in the form of salts or an oxide and a transition metal oxide are added. The at least one element and transition metal oxide may be dissolved simultaneously with or after addition of the mixed oxides, or may be added in the form of solutions. The transition metal oxides are added in an amount sufficient to adjust the surface atomic ratio substantially to the stoichiometric ratio after calcination. More particularly, the transition metal oxide is added in an atomic ratio to the mixed rare earth elements of 0.9:1.0 to 1.1:1.0, calculated as the metal and elements, not as oxides. It will be noted, however, that the resulting compound oxide does not have a surface atomic ratio of approximately 1:1 unless the at least one element as A' site is used. This is because oxides of rare earth elements tend to appear on the surface of the compound oxide if the at least one element is not added. In other words, the at least one element can suppress the oxides of rare earth elements from appearing on the compound surface, so that the surface atomic ratio of a transition metal and rare earth elements is controlled to be nearly stoichiometric.

In order to provide a high catalytic activity on the oxide surfaces, it is necessary to achieve substantially a stoichiometric ratio of the transition metal and the mixed rare earth elements in the final perovskite-type oxide. If the mixed rare earth elements and transition metals are chemically combined without addition of the at least one element, the ratio of the transition metals and the mixed rare earth elements on the surfaces of the compound oxide may be far away from the stoichiometric ratio. Thus, the catalytic activity becomes poor. To avoid this, at least one element selected from alkali metals, alkaline earth metals and rare earth elements other than those contained in the mixed rare earth elements from ores, is used in place of part of the mixed rare earth elements.

The at least one element is preferably added in the form of a solution. For this purpose, salts of the at least one element, which are soluble in water, are preferably used. Examples of the salts include nitrates, sulfates, acetates, hydrochlorides, carbonates and the like. Oxides may also be used. The at least one element is added in an amount of from 5 to 20 mole % of the total moles of the mixed rare earth elements.

The mixture is finally charged into an alkaline solution under agitation to permit precipitation. The alkaline solution may contain an oxidizing agent, such as hydrogen peroxide, and the oxidizing agent is preferably used because the resulting precipitate is obtained directly in the form of perovskite-type oxides if used. Otherwise, hydroxides may be obtained, which will be converted into corresponding oxides by calcination or sintering. The alkali used in the solution may be sodium hydroxide, potassium hydroxide, aqueous ammonia and the like. The resulting precipitate is washed with water and calcined at 300° to 400° C. to obtain a perovskite-type compound oxide. If necessary, the calcined oxide may be powdered and sintered in an oxidative atmosphere at temperatures of from 800° to 900° C. to obtain a powder of perovskite-type compound oxides.

The ores used to make the perovskite-type oxides may be any ores comprising a plurality of rare earth elements ordinarily in the form of oxides. A typical ore is monazite. The monazite has generally an oxide composition which comprises $La_2O_3$, $Pr_6O_{11}$, $Nd_2O_3$, $Sm_2O_3$, $CeO_2$ and the like. The contents of these oxides vary depending on the place of origin and may predominantly contain $La_2O_3$, $Pr_6O_{11}$ and $Nd_2O_3$. These rare earth elements have tri or higher valences.

The transition metals may be iron, cobalt, nickel or mixtures thereof as mentioned before. On mixing with the mixed rare earth element, the transition metal is preferably added at an atomic ratio, to the elements, of 0.9:1 to 1.1:1. As a result, the surface atomic ratio in the final perovskite-type oxide product comes near to a stoichiometric ratio of 1:1. When the transition metals are used as a mixture of two metals, one metal should be less than 30 wt% of the mixture. For instance, if cobalt is used as a main metal in the B site, iron or nickel should be used in an amount less than 30 wt%.

The perovskite-type oxide catalyst may be used as it is, or after deposition of carriers in various forms. The oxide catalyst using mixed rare earth elements has a high catalytic activity and a high resistance to heat as will be understood from the following examples, which should not be construed as limiting the present invention.

EXAMPLE 1

A mixture of oxides of rare earth elements (available under the designation of Lex 70 from Santoku Metals Ind. Co., Ltd.) was provided as A site elements. The mixture had a composition of 99.6 wt% of rare earth element oxides, 0.005 wt% of CaO and 0.2 wt% of Ig-loss. The oxide composition was comprised of 55.34 wt% of $La_2O_3$, 11.63 wt% of $Pr_6O_{11}$, 32.64 wt% of $Nd_2O_3$, 0.37 wt% of $Sm_2O_3$, and below 0.03 wt% of $CeO_2$. Fifty grams of the mixture was dissolved in nitric acid, to which cerium nitrate was added in an amount of 11%, calculated as cerium element, of the total number of moles of the oxide mixture, which was determined from the composition of the oxide mixture. Cobalt oxide was separately dissolved in nitric acid in an amount equal to the average number of moles of the mixed rare earth elements. This solution was added to the first mixture. The mixed solution was added to an excess of a caustic soda solution along with a hydrogen peroxide solution, followed by agitation to form a precipitate. The precipitate was well washed with distilled water and calcined at 400° C. for 1 hour. Thereafter, the resulting product was mixed in an agate mortar, followed by sintering in an electric furnace at 850° C. for 10 hours in an atmosphere of oxygen to obtain a perovskite-type compound oxide. This oxide was subjected to X-ray analysis, revealing the presence of a hexagonal perovskite structure along with slight peaks of $CeO_2$ and $Co_3O_4$. The specific surface area of the powder was determined according to the B.E.T. method and found to be 19.6 $m^2/g$.

The powder was charged into a 5% colloidal alumina aqueous dispersion to obtain a slurry and was applied onto a cordierite honeycomb having 64 cells/inch$^2$ in an amount of 8 wt%. This catalyst was used to determine an oxidation activity of CO at a space velocity of 18,000 $hr^{-1}$. The conversion of CO at a reaction temperature of 100° C. was found to be 70%. At the same time, a commercially sold platinum catalyst was used for comparison, at which it was found that the conversion of CO at 100° C. was only 30%.

EXAMPLE 2

Fifty grams of a mixed rare earth element (Lex 70) was dissolved in nitric acid, to which strontium nitrate was added in an amount of 20 mole% of an average composition of the mixed rare earth element. To the solution was added cobalt oxide dissolved in nitric acid and used in an equimolar amount corresponding to the average number of moles of the total rare earth elements. The mixed solution was charged into an excess of a caustic soda solution along with a hydrogen peroxide solution under agitation to form a precipitate. The precipitate was well washed with distilled water and calcined at 400° C. for 1 hour. Thereafter, the resultant product was divided into pieces in an agate mortar, followed by sintering in an electric furnace at 850° C. for 10 hours in an atmosphere of oxygen. The resulting powder was subjected to X-ray analysis, revealing formation of a perovskite structure. The specific surface area determined by the B.E.T. method was found to be 15.6 $m^2/g$. The powder was subsequently deposited on a honeycomb carrier in the same manner as in Example 1 and subjected to determination of an oxidation activity of CO at a space velocity of 18,000 $hr^{-1}$. As a result, the conversion of CO at a reaction temperature of 100° C. was 62.5%.

EXAMPLE 3

Similar to Examples 1 and 2, 50 g of Lex 70 was dissolved in nitric acid, to which thorium nitrate was added in an amount of 5.8% by mole, which was determined from an average composition of the mixed rare earth element. Cobalt oxide was separately dissolved in nitric acid in an equimolar amount to an average number of moles of the total rare earth elements. This solution was added to the first solution. The mixed solution was charged into an excess of a caustic soda solution along with a hydrogen peroxide solution and agitated to form a precipitate. The precipitate was well washed with distilled water and calcined at 400° C. for 1 hour, followed by dividing the precipitate into pieces in an agate mortar. Thereafter, the pieces were sintered in an electric furnace at 850° C. for 10 hours in an atmosphere of oxygen. The powder was subjected to X-ray analysis, revealing formation of a perovskite phase along with slight peaks of $ThO_2$ and $Co_3O_4$. The specific surface area determined by the B.E.T. method was found to be 17.6 $m^2/g$. This catalyst was deposited in the same manner as in Example 1 and subjected to determination of oxidation activity on CO at a space velocity of 18,000 $hr^{-1}$. As a result, it was found that the conversion of CO at a reaction temperature of 100° C. was 58.5%.

EXAMPLE 4

Similar to Example 1, 50 g of Lex 70 was dissolved in nitric acid, to which strontium nitrate was added in an amount corresponding to 20%, as strontium atom, of the number of moles determined from an average composition of Lex 70. Cobalt oxide was separately dissolved in nitric acid in such an amount that the number of moles of cobalt atoms was higher by 2 mole% than the total number of moles of the rare earth elements. This solution was added to the first solution. The mixed solution was charged into an excess of a caustic soda solution along with a hydrogen peroxide solution and agitated to form a precipitate. The precipitate was well washed with distilled water and calcined at 400° C. for 1 hour, followed by dividing into pieces in an agate mortar and sintering in an electric furnace at 850° C. for 10 hours in an atmosphere of oxygen. The resulting powder was subjected to X-ray analysis and found to have a single perovskite structure. The specific surface area determined by the B.E.T. method was found to be 14.8 m$^2$/g. The powder was deposited in the same manner as in Example 1 and subjected to determination of oxidation activity on CO at a space velocity of 18,000 hr$^{-1}$. As a result, it was found that the conversion of CO at a reaction temperature of 100° C. was 75.5%.

EXAMPLE 5

Similar to Example 1, 50 g of Lex 70 was dissolved in nitric acid, to which cerium nitrate was added in an amount corresponding to 10%, as cerium atom, of the number of moles determined from an average composition of Lex 70. Cobalt oxide was separately dissolved in nitric acid in an amount equal, calculated as cobalt atom, to the total number of moles of the mixed rare earth elements. This solution was added to the first solution. Moreover, ferric nitrate was also dissolved in nitric acid in an amount of 5% based on the total number of moles of the mixed rare earth elements and added to the above solution. The mixed solution was charged into an excess of a caustic soda solution along with a hydrogen peroxide solution and agitated to form a precipitate. The precipitate was well washed with distilled water and calcined at 400° C. for 1 hour, followed by dividing into pieces in an agate mortar and sintering in an electric furnace at 850° C. for 10 hours in an atmosphere of oxygen. The resulting powder was subjected to X-ray analysis and found to have slight peaks of CeO$_2$ and Co$_3$O$_4$ aside from a perovskite phase. The specific surface area determined by the B.E.T. method was found to be 18.7 m2/g. The powder was deposited in the same manner as in Example 1 and subjected to determination of oxidation activity on CO at a space velocity of 18,000 hr$^{-1}$. As a result, it was found that the conversion of CO at a reaction temperature of 100° C. was 73.8%.

As will be appreciated from the above examples, high oxidation activities are attained in spite of the fact that the mixed rare earth elements which are not uniform in composition are used. The product cost is 1.5 to 2 times less than the cost using a single rare earth element. The perovskite-type compound oxides of the invention have a good resistance to heat when determined at a temperature of 900° C. Accordingly, these oxides can be used in high temperature conditions as will not be expected with platinum group metal catalysts. Thus, the oxides will have wide utility instead of platinum group metal catalysts.

What is claimed is:

1. An oxidation catalyst of a perovskite-type compound oxide of the general formula, AA'BO$_3$, in which A represents a mixture of rare earth elements originally in the form of oxides collected from an ore containing the rare earth elements, A' represents at least one element which is selected from the group consisting of alkali metals, alkaline earth metals and rare earth elements and which have a tolerance factor, $t=(r_A+r_O)/\sqrt{2}(r_B+r_O)$, in which $r_A>0.90$ angstroms, $r_B>0.51$ angstroms, and $r_O$ is a radius of oxygen ion, in the range of $0.75\leq t\leq 1.0$, and has a valence and ionic radius different from the rare earth elements from the ore, and B represents a transition metal, said transition metal being added at an atomic ratio to the mixture of the rare earth elements of 0.9:1 to 1.1:1, said at least one element being added in such an amount that a surface atomic ratio of the transition metal and the rare earth elements of the A site is in the range of from 1.0:1.0 to 1.1.:1.0.

2. An oxidation catalyst according to claim 1, wherein said atomic ratio is substantially 1:1.

3. An oxidation catalyst according to claim 1, wherein said ore is monazite.

4. An oxidation catalyst according to claim 1, wherein said at least one element is cerium.

5. An oxidation catalyst according to claim 1, wherein said at least one element is strontium.

6. An oxidation catalyst according to claim 1, wherein said transition metal is cobalt.

7. An oxidation catalyst according to claim 1, where said perovskite-type compound oxide is deposited on a carrier.

8. A method for preparing an oxidation catalyst of a perovskite-type compound oxide which comprises providing an ore containing a plurality of rare earth elements in the form of oxides;
dissolving, in a mineral acid, said oxides and at least one element selected from the group consisting of salts or oxides of alkali metals, alkaline earth metals and rare earth metals other than the plurality of rare earth metals, said at least one element having a tolerance factor, $t=(r_A+r_O)/\sqrt{2}(r_B+r_O)$, in which $r_A>0.90$ angstroms, $r_B>0.51$ angstroms, and $r_O$ is a radius of oxygen ion, in the range of $0.75\leq t\leq 1.0$, and has a valence and ionic radius different from the rare earth elements from the ore;
dissolving at least one transition metal compound in a mineral acid and adding the resulting solution to the solution of said oxides and said at least one element;
adding the mixed solution to an alkaline solution under agitation to form a precipitate;
washing the precipitate with water; and
calcining the washed precipitate to obtain a perovskite compound oxide product of the formula, AA'BO$_3$, in which A represents a mixture of the plurality of rare earth elements, A' represents the at least one element, and B represents the transition metal, said at least one element being added in such an amount that a surface atomic ratio of the transition metal and the rare earth elements of the A site is in the range of from 1.0:1.0 to 1.1:1.0.

9. A method according to claim 8, wherein said at least one transition metal is used at an atomic ratio, to the total of the rare earth elements, of 0.9:1 to 1.1:1, so that the surface atomic ratio of the transition metal and said rare earth elements is approximately 1:1.

10. A method according to claim 8, wherein said at least one transition metal is a mixture of two transition metals, one of the transition metals being contained in an amount less than 30 wt.%.

11. A method according to claim 10, wherein said mixture is a mixture of cobalt and iron or nickel.

12. A method according to claim 8, wherein said alkaline solution contains an oxidizing agent.

13. A method according to claim 12, wherein said oxidizing agent is hydrogen peroxide.

14. A method according to claim 8, further comprising sintering the perovskite compound oxide product at 800° to 900° C.

* * * * *